June 3, 1969  R. F. MILLER  3,447,352
CORRUGATED PIPE COUPLING FORMING METHOD
Filed Dec. 23, 1966  Sheet 1 of 2
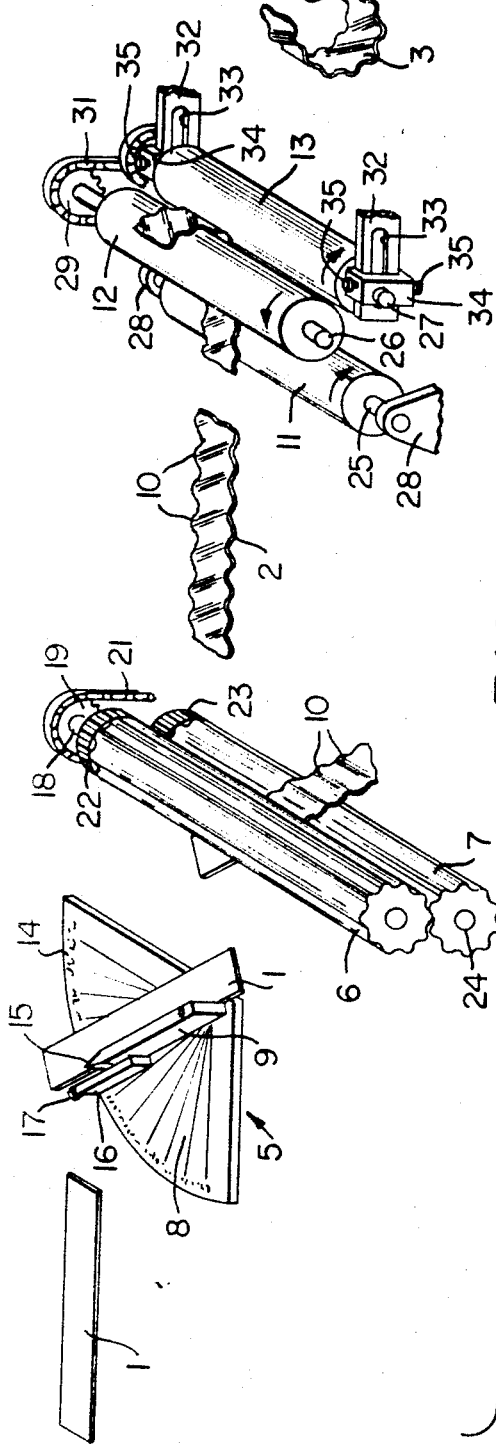
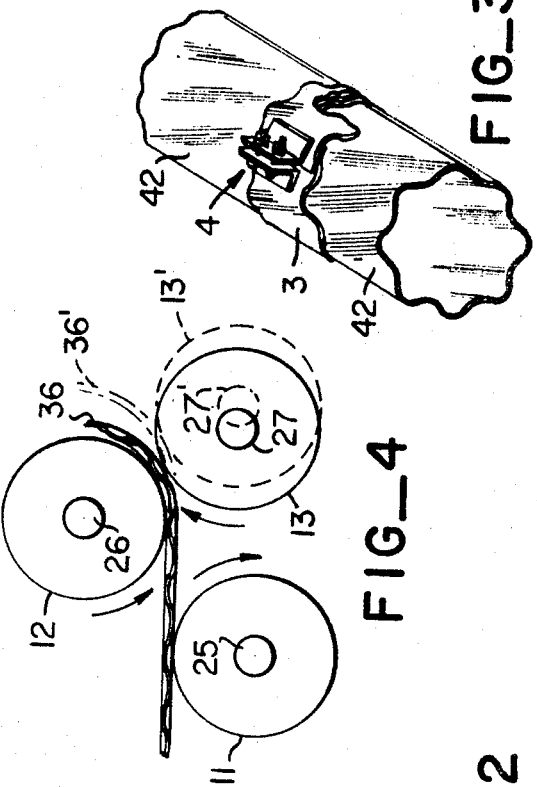
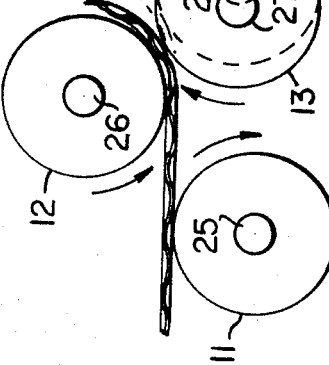
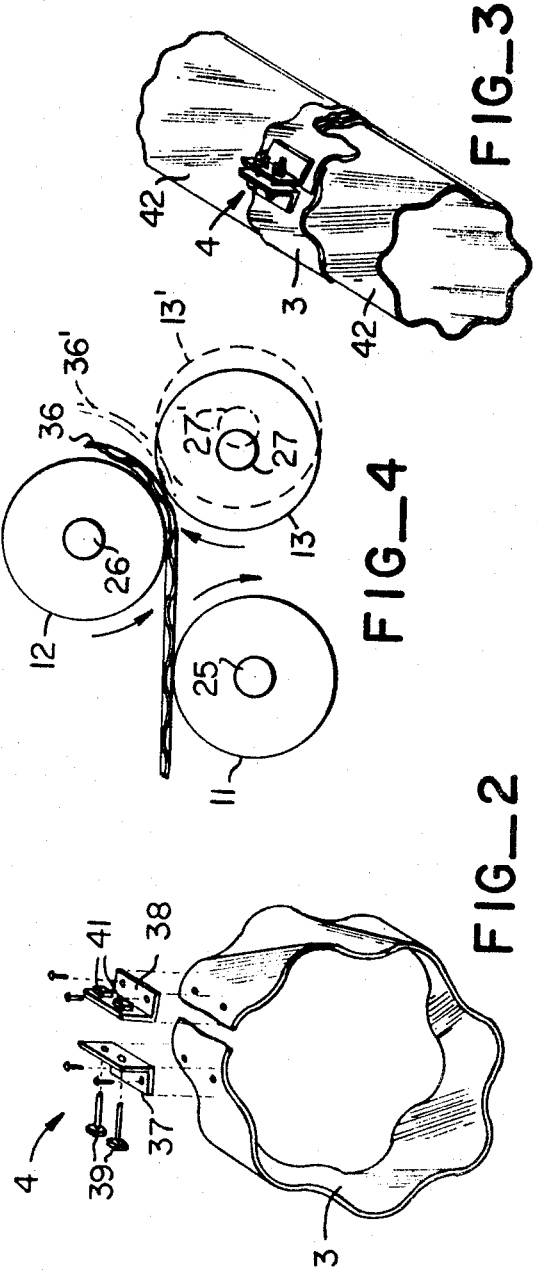
INVENTOR.
ROBERT F. MILLER
BY
Boyken, Mohler, Foster & Schwab
ATTORNEYS

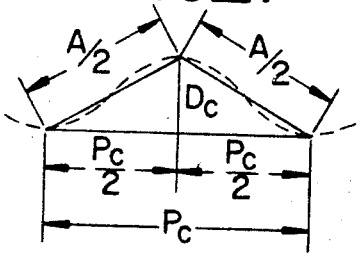
FIG_7
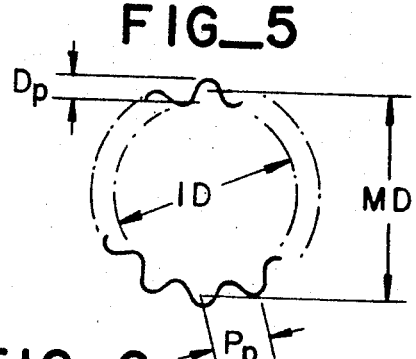
FIG_5
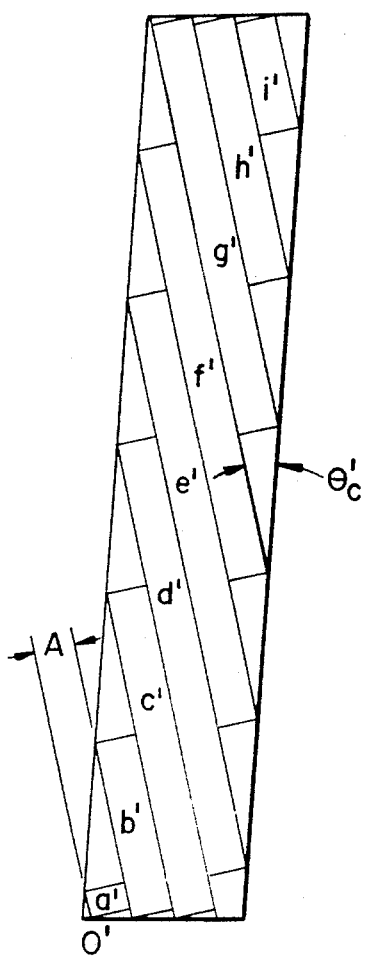
FIG_8
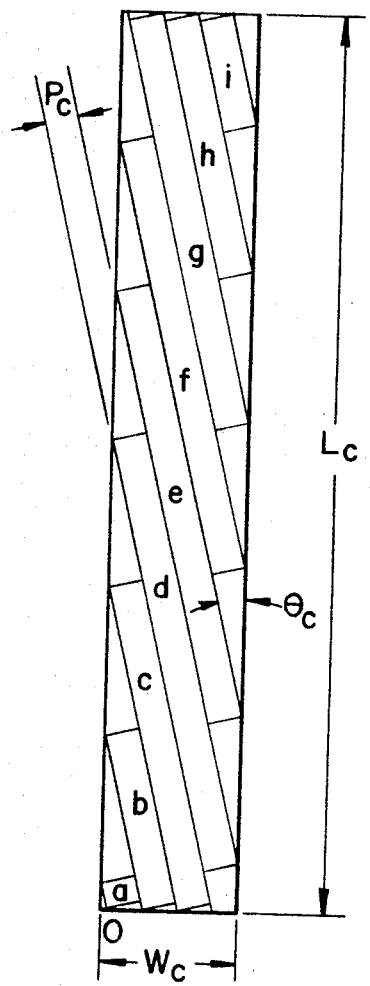
FIG_6

United States Patent Office 3,447,352
Patented June 3, 1969

3,447,352
CORRUGATED PIPE COUPLING FORMING METHOD
Robert F. Miller, Lafayette, Calif., assignor to Davis-Miller Corporation, Hayward, Calif., a corporation of California
Filed Dec. 23, 1966, Ser. No. 604,427
Int. Cl. B21b *1/12;* B21d *13/04;* F16l *21/06*
U.S. Cl. 72—187                                6 Claims

ABSTRACT OF THE DISCLOSURE

Apparatus and method for forming a band-type coupling for joining sections of helically corrugated pipe. An elongated flat sheet blank is formed with a series of corrugations along its length at an angle relative to its longitudinal axis substantially equal to the helix angle of the pipe sections to be coupled, and thereafter is curled about an axis normal to its longitudinal axis.

---

The present invention relates to couplings for joining sections of metal pipe, and more particularly to apparatus and a method for forming a band-type coupling for joining sections or lengths of helically corrugated sheet metal pipe.

Helically corrugated metal pipe is presently in wide use as culvert pipe and in numerous other liquid and gas conducting applications. It has been found that an extremely desirable coupling for joining the adjacent ends of sections of such pipe is provided by a band or strap of sheet metal curved into firm overlying engagement around the adjacent end portions of the sections, in straddling relation to the joint therebetween, with the band being formed with corrugations corresponding in angle and contour to the corrugations of the pipe sections. The coupling includes clamping means for maintaining the band in firm engagement around the end portions with the corrugations of such portions and the band in closely conforming relation and the opposite ends of the band overlapped.

A noteworthy feature of the above described band coupling is its simplicity of form which nevertheless yields significant advantages. For example, the coupling effectively precludes axial separation of the coupled pipe end portions and relative rotation therebetween. It may be applied simply and rapidly in the field and may be provided in any desired diameter and width so that it readily can accommodate pipe of any available diameter. Since the correspondingly formed surfaces of the pipe sections and coupling are in contacting relation over substantially the entire surface area of the coupling, the coupling can provide an extremely strong seal at the pipe joint if a sealant compound is applied to the inside surface of the coupling and opposed surfaces of the pipe end portions engaged thereby, or alternatively, a layer of resilient sealing material may be inserted between the pipe sections and coupling.

Heretofore, band couplings of the character described have been impractically high in cost, especially those having smaller diameters, specifically diameters of inches and less, due to the manner in which the couplings have been formed. Conventional methods of forming the couplings involve first forming helically corrugated pipe with corrugations of the desired angle and contour and a diameter approximately equal to the diameter of the pipe to be coupled, then cutting bands of the required width from the pipe, cutting the bands in the axail direction so that the band ends may be separated or overlapped, and finally securing clamp devices to the bands to complete the couplings.

To decrease the cost of helically corrugated band couplings and eliminate other objectionable results associated with conventional formation methods, applicant has devised a novel combination of apparatus and novel and simplified method for rapidly and accurately forming such couplings. In the method of the present invention a flat sheet metal blank is utilized, having a predetermined shape and dimensions as required to yield a single coupling of the desired width, diameter and surface contour. The flat blank is formed with corrugations corresponding in contour to those of the pipe sections to be coupled and extending at an angle to the longitudinal axis of the blank corresponding to the helix angle of the corrugations of the pipe to be coupled. The term "helix angle" as herein employed is defined below. During the corrugating operation the shape of the blank changes, i.e., a reduction in dimension occurs in the direction normal to the direction of extent of the corrugations, and this change in shape must be accounted for when selecting the appropriate blank shape and dimensions. The corrugated strip is curled about an axis extending normal to its longitudinal axis into an open band and after being curled, is provided with clamp devices.

Accordingly, it is a principal object of the present invention to provide an improved method and apparatus for forming angularly corrugated band-type pipe couplings which is simpled and lower in cost than heretofore.

Another object of this invention is the provision of a method and apparatus for individually forming angularly corrugated band-type pipe couplings from strips of flat sheet metal appropriately dimensioned to provide one such coupling.

A further object of this invention is the provision of a method for forming angularly corrugated band-type couplings by which the angle of the corrugations of the coupling relative to the side edges thereof accurately matches the helix angle of the corrugations of the pipe to be coupled.

An additional object of this invention is the provision of a novel and simplified method and apparatus for forming angularly corrugated sheet metal bands.

Other objects and advantages of this invention will become apparent from the description of one embodiment of the invention taken in conjunction with the drawings, in which:

FIG. 1 is a diagrammatic view illustrating the steps of the pipe coupling formation method of the present invention and the apparatus for performing said method.

FIG. 2 is an exploded view of a band-type pipe coupling provided by the method illustrated in FIG. 1.

FIG. 3 is a perspective view of the pipe coupling of FIG. 2 in coupling relation with a pair of sections of helically corrugated metal pipe.

FIG. 4 is a diagrammatic view illustrating the relationship of the three curling rolls utilized to curl a corrugated strip into a band and showing the manner in which the corrugated strip may be curled to different desired diameters.

FIG. 5 is a digrammatic view of the cross-sectional contour of a pipe section illustrating the dimensions set out in Example 1.

FIG. 6 is a diagram employed in the graphical method for determining the size and shape of the coupling blank, illustrated by Example 1.

FIG. 7 is a diagram employed in the graphical method illustrated by Example 1, including in broken line, a representation of the transverse cross-section of an individual coupling corrugation.

FIG. 8 is an additional diagram employed in the graphical method illustrated by Example 1.

In detail, referring to FIG. 1, as the initial step in the method of this invention there is provided a flat sheet metal blank 1 in the shape of a parallelogram which in the usual case approximates a rectangle, but deviates slightly therefrom.

The appropriately dimensioned blank 1 is formed with corrugations 10 which extend at an angle to the longitudinal axis of the blank with the result that said blank takes on the form of an angularly corrugated rectangular strip 2. Corrugation is preferably accomplished through the use of a gauge table 5 and corrugating means in the form of a pair of intermeshing, longitudinally ridged corrugating rolls, 6, 7. Table 5, functioning as positioning means, includes a protractor surface 8 and blank feed guide member or arm 9, and from said table blank 1 is fed to corrugating rolls 6, 7 with the longitudinal axis of the blank extending at an angle relative to the longitudinal axis of rolls 6, 7.

Corrugated strip 2 is curled about an axis normal to its longitudinal axis to form an open corrugated band 3. Curling means incorporating a set of three curling rolls comprising a strip support roll 11, a pressure roll 12 and a strip bending roll 13, are preferably employed to accomplish the curling step. After band 3 has been formed a clamp device 4 (FIGS. 2, 3) is provided thereon, and the coupling is complete.

During the corrugating step of the coupling formation method a change occurs in the dimensions of blank 1, i.e., there is a reduction in dimension in the direction normal to the direction of extent of the corrugations. Since the corrugations 10 extend at an angle to the longitudinal axis of blank 1 the reduction in dimension occurs in a direction which is at an angle to the blank side edges. In most combinations of coupling diameter and corrugation contour and angle this effect is sufficiently marked as to require inclusion in determining the correct shape for blank 1. A method of determining such shape taking into account the change in dimension is hereinafter set out in detail.

In the corrugating operation blank 1 is formed into corrugated strip 2 (FIG. 1), with corrugations 10 extending at an angle to the side edges of said strip. The angle of corrugation is selected so that when strip 2 is curved around the pipe to be coupled the angle of the corrugations of the band 3, curved therefrom, and the helix angle of the corrugations of the pipe will be the same, as illustrated in FIG. 3. Such correspondence occurs when the angle between the side edges of corrugated strip 2 and the direction of extent of the corrugations thereof equals the pipe corrugation helix angle.

Helically corrugated metal pipe is normally fabricated from an elongated strip of sheet metal which has been formed with longitudinally extending corrugations. The corrugated strip is curled into helical convolutions and adjacent strip edges are joined by welding or by bending into a lock-seam to form the completed pipe. The pipe corrugations follow a helical path directed at an angle to the pipe circumference, which angle is termed the "helix angle." For pipe thus formed the helix angle is calculated by the formula;

$$\text{Sine of the helix angle} = \sin \theta = \frac{\text{width of the corrugated strip}}{\text{mean circumference of the pipe}}$$

where the mean circumference is taken along points midway between the ridges and valleys of the corrugations.

In a preferred corrugating procedure gauge table 5 (FIG. 1) or other means providing a protractor surface 8 and a blank feed guide arm 9 is utilized for accurately positioning and maintaining correct positioning of blank 1 for feeding to a pair of corrugating rolls consisting of upper roll 6 and lower roll 7. On protractor surface 8 are indicia 14 representing angles from zero degrees to ninety degrees, preferably in increments of ten minutes. Table 5 carries blank feed guide arm 9 pivotally secured at one end to said table at the point corresponding to the center of the protractor circle. The end of arm 9 opposite the pivoted end is formed as a pointer 15, and a locking bar 16 is secured to said end, having a locking screw 17 which may be screwed into engagement against the edge of table 5 to lock arm 9 in any desired angular position as read from indicia 14, or retracted from the edge of said table to permit arm 9 to slide on surface 8.

To accomplish feeding of blank 1 to rolls 6, 7 at any desired angle, guide arm 9 is pivoted into position with pointer 15 aligned with indicia 14 representing the desired angle, and locking screw 17 is tightened against table 5. Blank 1 is aligned by positioning the side edge thereof against guide arm 9. Pressure is exerted on said blank to hold it against guide arm 9 to maintain such alignment while said blank is advanced into contact with rolls 6, 7, whereupon it is drawn therebetween in the direction normal to the axes of said rolls.

Upper corrugating roll 6 and lower corrugating roll 7 are disposed with their axes parallel with the base or zero degree line of the protractor and have corresponding corrugating surfaces of axially extending alternating ridges 20 and valleys 20', which are in enmeshing relationship. The surface contours of ridges 20 and valleys 20' are selected to yield the desired contour for corrugations 10. Roll 6 is supported by a shaft 18 at one end of which is rigidly secured a sprocket wheel 19, around which is engaged an endless chain 21 which may be driven by any conventional means (not shown), for rotating roll 6. A gear 22 rigid on shaft 18 between the end of roll 6 and sprocket wheel 19 is in enmeshing relationship with a similar gear 23 rigid on the shaft 24 of roll 7. When chain 21 is driven in the counterclockwise direction, as viewed in FIG. 1, roll 6 is rotated in the counterclockwise direction while roll 7 is rotated in the clockwise direction, so that blank 1 is passed between rolls 6, 7 in the direction from left to right, as seen in FIG. 1, while being maintained at the same angle relative to the axes of the corrugating rolls, at which it was fed to said rolls.

When strip 2 issues from rolls 6, 7 it has a corrugated contour and a rectangular shape. In this form it is curved into a band 3 by being passed through the set of three curling rolls, consisting of support roll 11, pressure roll 12 and bending roll 13 (FIGS. 1, 4).

Rolls 11, 12 and 13 are rotatably supported on parallel shafts 25, 26, 27, respectively. Support roll 11 (FIG. 1) is journaled in bearings 28 as an idler roll, being provided for supporting the oncoming strip 2 and directing said strip between rolls 12, 13. Pressure roll 12 is positioned forwardly of support roll 11 with its bottom surface above the top surface of support roll 11 a slight distance approximating the depth of corrugations 10 of the strip to be curled. At one end of a shaft 26 thereof is rigidly secured a sprocket wheel 29 around which is engaged an endless chain 31 which is driven by conventional means (not shown). Bending roll 13 is positioned slightly forwardly of pressure roll 12 with its top surface slightly above the level of the bottom surface of pressure roll 12. The shaft 27 of roll 13 (FIG. 1) is supported for rotation as well as for translation in a horizontal plane. The ends of shaft 27 are freely passed through slotted mounting bars 32 having slots 33, and are also received in bearing brackets 34 mounted on bars 32 for adjustable positioning therealong by means of locking screws 35. At one end of shaft 27, outwardly of bearing bracket 34 is rigidly secured a sprocket wheel 36 around which is engaged an endless chain 37 which is driven by conventional means (not shown).

Strip 2 is fed to the set of rolls 11, 12, 13 with its longitudinal axis normal to the axes of said rolls. With the leading end of strip 2 supported on support roll 11 said strip is advanced into contact with pressure roll 12 and bending roll 13, which are driven in the counterclockwise and clockwise directions, respectively, as seen in FIGS. 1, 4, to draw strip 2 therebetween. Because of the above-described relative positioning of the rolls 11, 12, 13, strip 2 is pressed into contact against bending roll 13 by pressure roll 12 and is deformed or curled out of its plane by said bending roll 13. The radius of curvature of the resulting band 3 is determined by the spacing between rolls 12, 13 (FIG. 4), such spacing being varied by changing the position of bearing brackets 34 (FIG. 1) along bars 32. The radius of curvature is increased when the spacing between rolls 12, 13 is increased, as seen in FIG. 4, wherein curved strip portion 36 curled with roll 13 in the full line position has a smaller radius of curvature than curved strip portion 36' curled with roll 13 in the broken line position 27'.

After band 3 is curled it is provided with a clamp device 4, which may be of conventional construction of the type formed of a pair of metal right angle brackets 37, 38 (FIG. 2). Bracket 37 is welded or riveted to band 3 adjacent one end thereof and bracket 38 is secured to the band at its opposite end, and said bracket 37 is positioned inwardly of the end edge of the band to permit the end to be overlapped by the opposite end of the band a desired amount. Bolts 39 are passed through apertures in brackets 37, 38 and are threaded into nuts 41 welded to bracket 38 for drawing and securing said brackets and the ends of band 3 together when the coupler is disposed around lengths of pipe 42 (FIG. 3) to be coupled, and maintaining band 3 in coupling engagement around said length of pipe.

In order for the side edges and overlapped ends of the completed coupling to be in alignment and for the angles of corrugation of the coupling band 3 and coupled pipe sections 42 to match, as in FIG. 3, it is necessary that after completion of the corrugating operation corrugated strip 2 be rectangular, with the angle between the direction of extent of corrugations 10 thereon and the strip side edge corresponding to the helix angle of the pipe sections. Due to the deformation which occurs during the corrugating operation this normally requires that blank 1 have the shape of a nonrectangular parallelogram. Factors determining the specific blank dimensions include the diameter of the coupled pipe, depth of corrugation, pitch or width and angle of corrugation, and such dimensions readily may be obtained by employing the graphical method illustrated by the sample calculation (Example 1) below.

EXAMPLE 1

*Pipe to be coupled (see FIG. 5)*

|  | Inches |
|---|---|
| Inside diameter (ID) | 24 |
| Corrugation: |  |
|    Depth ($D_p$) | 1 |
|    Pitch width ($P_p$) | 3 |
| Mean diameter (MD) | 25 |
| Width of corrugated metal strip from which pipe is formed ($W_p$) | 18 |

Helix angle (of corrugations)=$\theta$, derived as follows:

$$\text{Sin } \theta = W_p/\pi(MD)$$
$$= 18/\pi(25) = .229$$
$$\theta = 13°15'$$

*Corrugated strip 2*

Width=$W_c$=12 inches, selected to provide ample pipe engaging surface area

Length=$L_c$=Mean circumference of pipe plus desired coupling end overlap
$$=\pi MD + 1\frac{1}{2} \text{ inches}$$
$$\approx \pi(MD+.5) = 80.2 \text{ inches}$$

Corrugation:

Angle relative to side edge=$\theta_c = \theta = 13°15'$
   Depth=$D_c = D_p = 1$ inch
   Pitch=$P_c = P_p = 3$ inches Starting with the above derived and selected values for the corrugated strip 2 the dimensions of blank 1 are obtained graphically with references to FIGS. 6–8. Looking at FIG. 6, as an initial step the length and width dimensions of corrugated strip 2 are laid out to scale, using the values for $L_c$ and $W_c$, and a rectangle is drawn. Within the rectangle are drawn lines extending at an angle $\theta_c$ relative to the side edges of the rectangle and regularly spaced apart a distance equal to $P_c$, to represent the series of corrugations. Starting with one of the outermost corrugation lines, lines are then drawn between pairs of said corrugation lines, perpendicular thereto, at the points of intersection of said lines with the lines of the rectangle, to form a series of adjacent parallel rectangles *a–i* (FIG. 6). After the rectangles are completed the point of intersection of the lower lefthand corner of rectangle *a* with the lower end of the rectangle representing strip 2 is taken as a reference point or origin O to assist in drawing the diagram of FIG. 8.

The next step is to calculate the amount of flat sheet material, i.e., width of a strip thereof, required to yield one corrugation having a pitch of $P_c$ and depth of $D_c$. Referring to FIG. 7, an approximation is employed in obtaining this dimension, with the curved contour of the corrugation, represented by broken line 43 in FIG. 7, being approximated by the two upper sides of the triangle which are each designated $A/2$. Thus, width of a strip of material yielding one corrugation of pitch $P_c$ and depth $D_c \approx 2(A/2) = A$
$$= 2\sqrt{D_c^2 + (P_c/2)^2} = 2\sqrt{1^2 + (3/2)}$$
$$= 3.6 \text{ inches}$$

To plot the diagram representing blank 1 (FIG. 8) a point is selected as an origin O' corresponding to point O of FIG. 6, and a line is drawn through point O' parallel to the corrugation lines of FIG. 6. A second line is drawn through point O' perpendicular to the first line, and then a third line is drawn through the first line, above and parallel to the second line, a distance therefrom equal to the length of the left and right sides of rectangle *a* in FIG. 6. At the distance A to the right of the first line a line parallel to said first line is drawn, completing the four sides of rectangle *a'* (FIG. 8).

Rectangle *b'* is next drawn. The lower left-hand corner of rectangle *b'* is located by spacing it below the lower right-hand corner of rectangle *a'* the same distance as that between the corresponding corners of rectangles *a* and *b* in FIG. 6. The left side of rectangle *b'* is the same length as the sides of rectangle *b*, and its width is equal to the distance A. Rectangle *c'* is drawn in a similar manner, as are rectangles *d'–i'*, except that for rectangles *d'–i'* the lower left-hand corner of the rectangle is spaced above rather than below the lower right hand corner of the immediately preceding rectangle, according to the spacing of corresponding rectangles *d–i* of FIG. 6.

After all of the rectangles *a'–i'* are completed, straight lines are drawn through the corners thereof corresponding to corners of rectangles *a–i* (FIG. 6) which intersect the lines defining the four sides of the rectangle in FIG. 6 representing strip 2. The resulting figure is a non-rectangular parallelogram of the appropriate shape for blank 1, but on a reduced scale, and the correct blank shape and dimensions may be directly determined from the figure.

It should be noted that the angle $\theta_c'$ between the direction of extent of rectangles *a'–i'* and the side edges of the parallelogram of FIG. 8 is greater than $\theta_c$. For the dimensions of Example 1: $\theta_c = 13°15'$, and $\theta_c' = 15°30'$.

In order to obtain strips 2 with corrugations at an angle $\theta_c$ blank 1 must be fed to corrugating rolls 6, 7 with the angle between its side endges and the longitudinal axes of rolls 6, 7 equal to $\theta_c'$. In this connection it should be noted that indicia 14 on gauge table 5 may indicate the actual angle at which blank 1 is fed, or alternatively may incorporate a correction factor and directly indicate the corrugation angle $\theta_c$.

As hereinabove described, the coupling formation method of this invention broadly comprises the steps of initially providing a flat sheet blank, then forming a series of corrugations along the length of the blank at angle relative to its longitudinal axis, and thereafter curling the corrugated blank about an axis normal to its longitudinal axis. The angle at which the corrugations are formed in the blank is selected to be substantially equal to the helix angle of the pipe langths to be coupled.

It is to be understood that the claims appended hereto are intended to cover all changes and modifications to the invention disclosed herein which do not depart from the spirit and scope of the invention. For example, the corrugations may be formed in blank 1 by a stamping operation. Also, blanks corresponding to blanks 1 may be provided in rectangular strip form and trimmed subsequent to the corrugating operation. While the present apparatus and method have been described in conjunction with formation of pipe couplings, they are not limited to such application and may be utilized in the production of angularly corrugated sheet metal bands for any purpose.

I claim:
1. A method of fabricating a curved band having corrugations extending at a predetermined angle relative to the side edges thereof, comprising the steps of:
   (a) providing an elongated flat sheet blank;
   (b) forming a series of corrugations along the length of said blank extending at said predetermined angle relative to the longitudinal axis of said blank; and thereafter
   (c) curling said blank into a band about an axis normal to the longitudinal axis of said blank.
2. A method of fabricating a curved metal band adapted for use as a coupling for coupling together lengths of helically corrugated pipe and having corrugations extending at an angle generally matching the helix angle of the corrugations of the coupled pipe lengths when said band is in coupling relation around said lengths, comprising the steps of:
   (a) providing a flat, elongated sheet metal blank;
   (b) forming a series of corrugations along the length of said blank extending at an angle relative to the longitudinal axis of said blank substantially equal to said helix angle of the corrugations of said pipe lengths; and thereafter
   (c) curling said blank into a band about an axis normal to the longitudinal axis of said blank.
3. The method of claim 2, in which:
   (d) said series of corrugations is formed by passing said blank between a pair of corrugating rolls having surface contours defining axially extending corrugations, the longitudinal axis of said blank extending at a predetermined angle relative to the axes of said rolls being substantially equal to the helix angle of the corrugations of said pipe lengths.
4. The method of claim 2, in which:
   (d) said flat sheet metal blank is provided in a predetermined nonrectangular parallelogram shape: and
   (e) the shape of said blank is changed from said nonrectangular shape to a rectangular shape while said series of corrugations is formed.
5. The method of claim 3, which includes:
   (e) providing supporting and guiding surfaces for maintaining said blank with its longitudinal axis at said predetermined angle relative to said axes of said pair of rolls while said blank is advanced thereto.
6. The method of claim 3, which includes:
   (e) supporting said blank an a protractor surface and in engagement with a guide member selectively positionable on said surface for selectively aligning said blank relative to said pair of corrugating rolls for feeding thereto at said predetermined angle.

References Cited
UNITED STATES PATENTS

| | | | |
|---|---|---|---|
| 367,527 | 8/1887 | Keene | 72—196 |
| 522,004 | 6/1894 | Bradley | 72—196 |
| 2,502,124 | 3/1950 | Bray | 269—303 |
| 2,641,830 | 6/1953 | Lamb et al. | 72—185 |
| 3,239,254 | 3/1966 | Campbell | 285—419 |
| 3,298,721 | 1/1967 | Wiley | 285—419 |

CHARLES W. LANHAM, *Primary Examiner.*

L. A. LARSON, *Assistant Examiner.*

U.S. Cl. X.R.

72—196, 379; 285—419, 424